United States Patent
Hayashida (10) Patent No.: US 6,341,407 B1
(45) Date of Patent: Jan. 29, 2002

(54) FRICTIONAL HINGE DEVICE AND A PORTABLE BUSINESS DEVICE HAVING THE HINGE DEVICE INCORPORATED THEREINTO

(75) Inventor: Takaaki Hayashida, Aichi-ken (JP)

(73) Assignee: Chuo Hatsujo Kabushiki Kaisha, Nagoya (JP)

( * ) Notice: Subject to any disclaimer, the term of this patent is extended or adjusted under 35 U.S.C. 154(b) by 0 days.

(21) Appl. No.: 09/565,027

(22) Filed: May 5, 2000

(30) Foreign Application Priority Data

May 7, 1999 (JP) .................................. 11-127626

(51) Int. Cl.⁷ .............................................. E05D 11/08
(52) U.S. Cl. .............................. 16/342; 16/319; 16/337; 16/339
(58) Field of Search .......................... 16/342, 319, 337, 16/339, 343, 347

(56) References Cited

U.S. PATENT DOCUMENTS

| | | | | | |
|---|---|---|---|---|---|
| 301,164 | A | * | 7/1884 | Loughry | 16/342 |
| 4,976,007 | A | * | 12/1990 | Lam | 16/302 |
| 5,031,275 | A | * | 7/1991 | Chiang | 16/263 |
| 5,206,790 | A | * | 4/1993 | Thomas et al. | 361/380 |
| 5,509,176 | A | * | 4/1996 | Karl | 16/342 |

FOREIGN PATENT DOCUMENTS

JP  7-26825  1/1995

\* cited by examiner

*Primary Examiner*—Anthony Knight
*Assistant Examiner*—Mark Williams
(74) *Attorney, Agent, or Firm*—Morgan, Lewis & Bockius LLP (57) ABSTRACT

In a frictional hinge device, a metallic shaft has a rotational axis as a rotational center. A support block is molded in synthetic resin around the metallic shaft so that the support block is rotatably supported by the metallic shaft relatively. The support block is held at any angular position by a surface friction resistance between the support block and the metallic shaft. A shape factor (W) in relation with the metallic shaft and the support block is defined by the following inequality:

$1.5 \leq W \leq 3.5$, where $W = \{1+(D_o/D_h)^2\}/\{1-(D_o/D_h)^2\}$, $(D_o)$ is a diameter of the metallic shaft, $(D_h)$ is a diameter or its equivalent of the support block.

4 Claims, 15 Drawing Sheets

FRICTIONAL HINGE DEVICE AND A PORTABLE BUSINESS DEVICE HAVING THE HINGE DEVICE INCORPORATED THEREINTO

BACKGROUND OF THE INVENTION

1. Field of the Invention

The invention relates to a frictional hinge device which is used to pivotably support a lid plate and a display of a portable business device such as a laptop note type personal computer, and particularly concerns to a frictional hinge device used to hold the lid plate and the display at a desired angular position by friction.

2. Description of Prior Art

This type of the frictional hinge device has been known as a torque damper which regulates a frictional torque to support a lid plate at the desired angular position. Examples are as follows:

(a) A metal plate (in the form of disc) is provided in a slit defined on a metal casing so that the metal plate can rotate in unison with a shaft. The metal plate is always urged by means of a spring washer.

(b) A rotary shaft is supported by a metal plate with a stay member engaged against one end of the metal plate. The torque damper utilizes a surface friction between the stay member and the metal plate.

(c) A shaft is rotatably supported by a taper bearing in such a manner that the shaft is urged against a tapered surface of the bearing by means of a helical spring or a dish spring.

(d) A rotary shaft is directly clamped by a metal holder to provide a surface friction between the rotary shaft and the metal holder.

On the other hand, a shaft lock device is disclosed by Laid-open Japanese Patent Application No. 7-26825 (laid-open on Jan. 27, 1995, assigned to Kabushiki Kaisha Kato Manufacturing Factory). This teaches that an outer shaft is made of a synthetic resin and integrally molded with an inner shaft. Due to a surface friction resistance caused from a thermal expansional difference between the inner and outer shafts, it is possible to hold the inner shaft at the desired angular position while permitting the inner shaft to pivot relative to the outer shaft against the surface friction resistance therebetween. This torque holds a display of a note type personal computer at the desired angular position.

In the frictional torque dampers (a) and (b), these however increase the number of components parts. Additionally, these dampers necessitate to diametrically enlarge the metal plate, which hampers to make them compact and less costly. In order to adjust the friction, it is necessary to alter a caulking degree of the metal plate against the shaft. This is a time-consuming procedure.

In the frictional torque damper (c), the urging force of the helical spring is altered by a threaded portion and nut when adjusting the surface friction on the tapered surface. This inconveniently requires a time-consuming operation.

In the frictional torque damper (d), the surface friction is insufficient to maintain a stable torque for an extended period of time.

In the shaft lock device disclosed by the Laid-open Japanese Patent Application No. 7-26825, a surface roughness, surface treatment and frictional coefficient are suggested as means to determine the torque between the inner and outer shafts together with their diametrical dimensions.

However, this disclosure remains silent about qualitative and quantitative analyses on the relationship between the inner and outer shafts. This causes no smaller variations on the torque when the inner shaft pivotally moves. This also causes abnormal noise due to a stickslip phenomenon when pivotally moving the inner shaft while losing a good endurance with a frictional torque reduced due to an unacceptable amount of wear between the inner and outer shafts.

When using the surface friction between metallic members, grease is required for lubrication. The grease becomes a likely cause for environmental pollution.

Therefore, the present invention has been made with the above drawbacks in mind, it is a main object of the invention to provide a frictional hinge device which is inexpensive with no fear for environmental pollution and no abnormal noise due to a stickslip phenomenon with the least torque variations and is capable of maintaining a stable surface friction resistance between a shaft member and a support member for an extended period of time so as to hold the support member at the desired angular position based on the surface friction resistance.

SUMMARY OF THE INVENTION

With a frictional hinge device having a support member rotatably supported by a metallic shaft member, a shape factor (W) in relation to the metallic shaft member and the support member is defined as $1.5 \leq W \leq 3.5$.

This secures a relatively larger torque/volume efficiency and torque holding rate in which the support member tightly engages with the metallic shaft member to provide a good surface friction resistance therebetween. When the support member is subjected to a frictional torque greater than the surface friction resistance, the support member pivots around the metallic shaft member relatively. When the support member is subjected to a frictional torque less than the surface friction resistance, the support member stays to be held at an appropriate angular position by the surface friction resistance.

With the shape factor (W) in relation to the metallic shaft member and the support member defined as $1.5 \leq W \leq 3.5$, this increases the torque accumulated per a unit volume to enhance the torque/volume efficiency with a greater torque holding rate, and thereby significantly reduces torque variations and a stickslip phenomenon with no abnormal noise due to the stickslip phenomenon when the support member pivots in relative to the metallic shaft member. This enables to readily predetermine a required quantity of the surface friction resistance to hold the support member at the desired angular position.

With the surface friction resistance equivalent to a total frictional length between the support member and the metallic shaft member, it is possible to cope with an increased frictional torque between the support member and the metallic shaft member by combining a plurality of the same frictional hinge devices. This eliminates the necessity of discretely manufacturing a longer frictional hinge device. This is advantageous in cost.

In addition to the shape factor (W) defined as $1.5 \leq W \leq 3.5$, the support member is formed by a synthetic resin. This enables to tightly engage the synthetic resin with the metallic shaft member due to the surface friction resistance between the different materials.

With the support member molded by a synthetic resin around the metallic shaft member tightly by injecting the synthetic resin into a heated mold in which the metallic shaft is placed in advance, the support member tightly engages with the metallic shaft member due to a residual stress appeared between the support member and the metallic shaft member when cooling the synthetic resin to shrink.

By molding the support member with the synthetic resin around the metallic shaft member, it is possible to reduce a manufacturing cost.

With the frictional hinge device used to pivotably move a display for a portable business device, it is possible to hold the display at the desired angular positions to ensure a good view on the display.

With the synthetic resin applied to the support member in which a bending elasticity fluctuates as small as up to 30% under the operating temperature ranging from −20 to 80° C., it is possible to maintain a sufficient surface friction resistance against the metallic shaft member even when the normal ambient temperature fluctuates. This prevents deterioration of friction surfaces of the support member and the metallic shaft member so as to maintain the stable surface friction resistance for an extended period of time.

By way of illustration, the synthetic resin is represented by PC (polycarbonate), PAR (polyarylate), PPS (polyphenylene sulphide) and the like.

With the synthetic resin mixed with an organic or inorganic antifriction medium, it is possible to ensure a smooth pivotal movement with the shaft member. As opposed to the case in which greasing agent is applied between the support member and the shaft member, it is possible to prevent the perimeter from being polluted. It is also possible to exceedingly reduce the wear dust produced between the support member and the shaft member, thereby maintaining a stable surface friction resistance therebetween for an extended period of time.

By mixing the synthetic resin with fibrous material to improve its mechanical strength, it is possible to ameliorate the endurance.

BRIEF DESCRIPTION OF THE DRAWINGS

Preferred forms of the present invention are illustrated in the accompanying drawings in which.

DETAILED DESCRIPTION OF THE PREFERRED EMBODIMENTS

Figure 1:
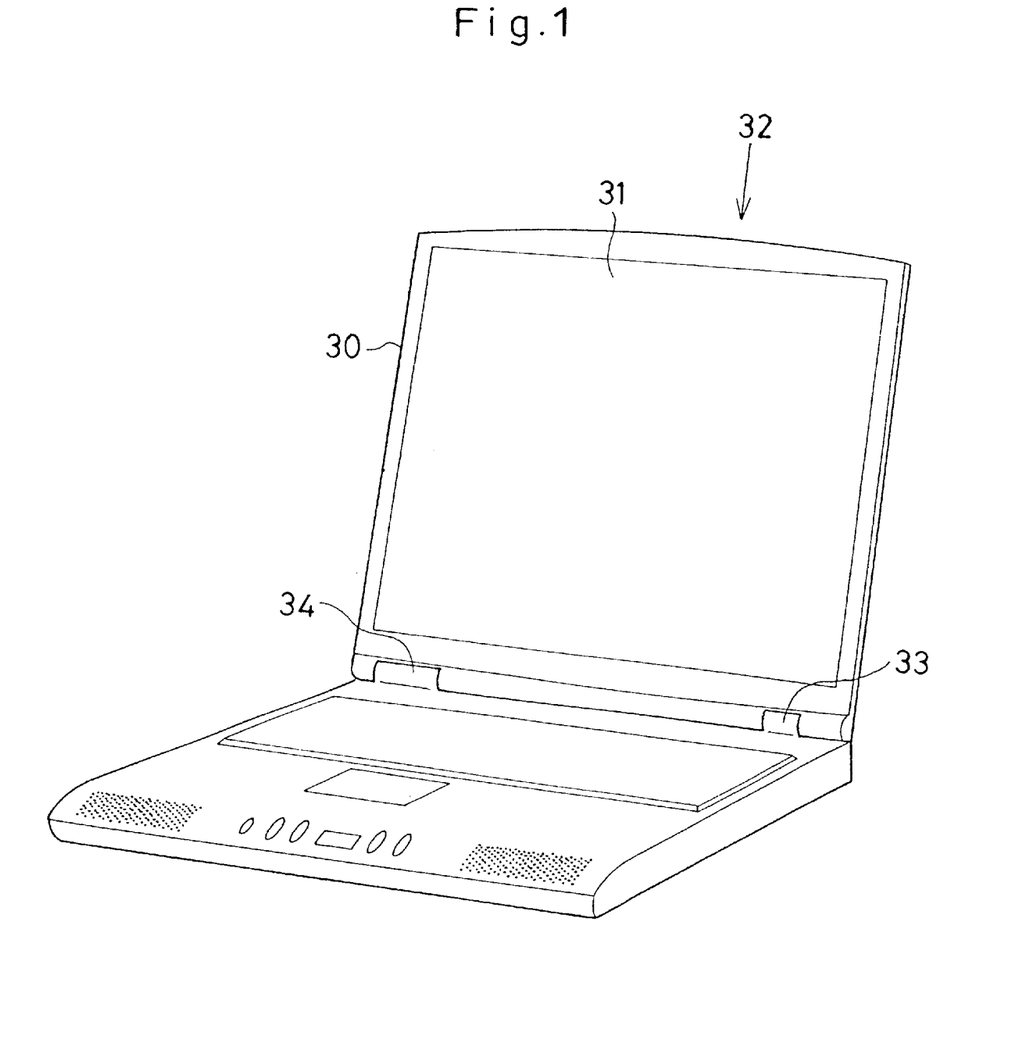
FIG. 1 is a perspective view of a laptop note type personal computer into which a frictional hinge device is incorporated according to a first embodiment of the invention.

Referring to FIGS. 1 through 5 which show a frictional hinge device 1 according to a first embodiment of the invention. The frictional hinge device 1 is used at lower ends 33, 34 to pivotally move a lid plate 30 for a liquid crystal display 31 in a laptop note type personal computer 32 (portable business device) as shown in FIG. 1. The lid plate 30 is adjusted at the desired angular position to secure a good view on the liquid crystal display 31.

Figure 1A:
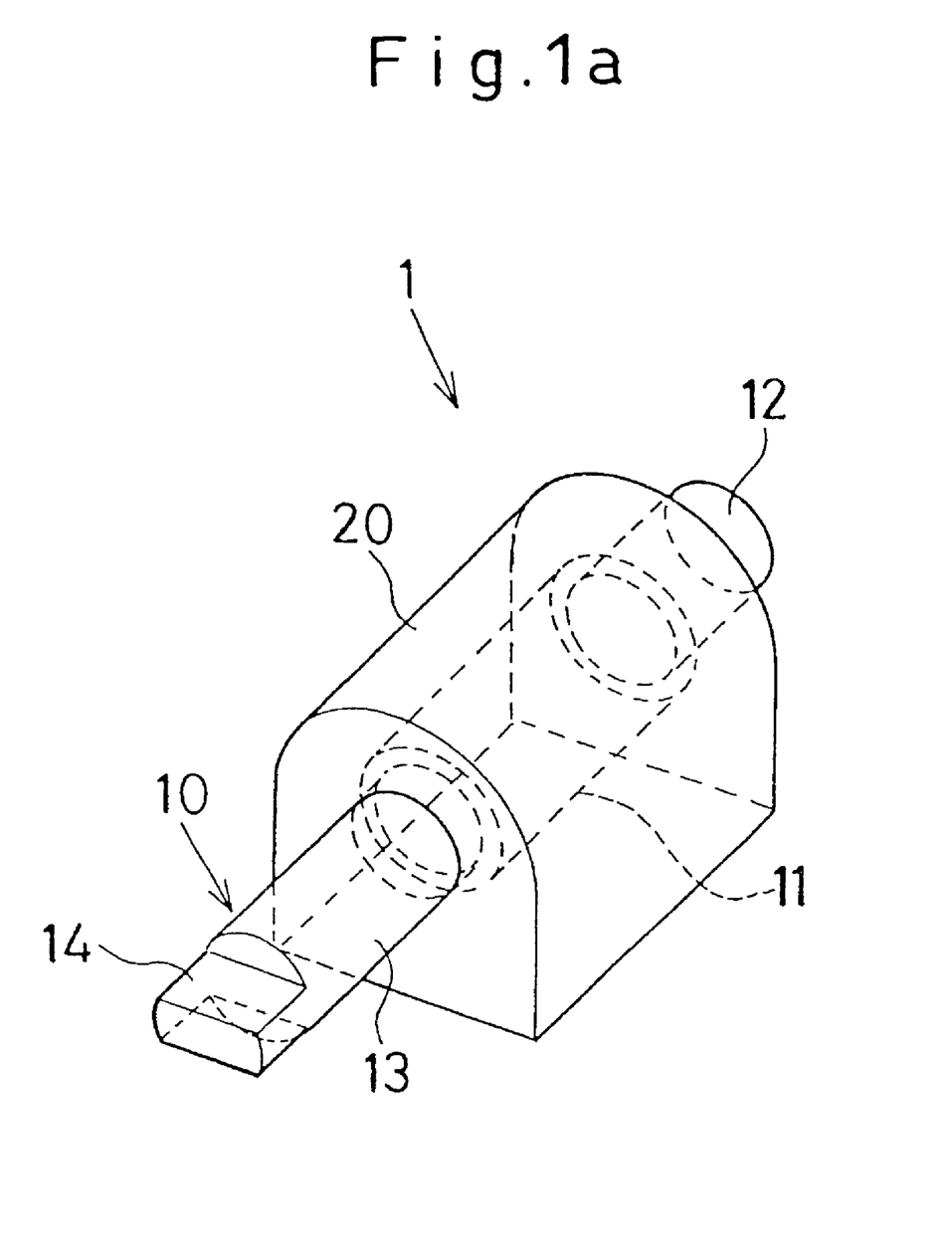
FIG. 1a is a perspective view of the frictional hinge device.

As shown in FIG. 1a, the frictional hinge device 1 has a metallic shaft 10 which serves as a rotational axis of a rotational center. The metallic shaft 10 is secured to the lid plate 30 of the personal computer 32 to pivotally move in unison with the lid plate 30. A support block 20 is provided to pivotably support the metallic shaft 10 in relative to the support block 20.

Figure 2:
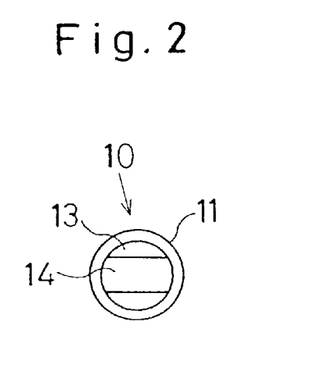
FIG. 2 is a plan view of a shaft member of the frictional hinge device.
Figure 3:
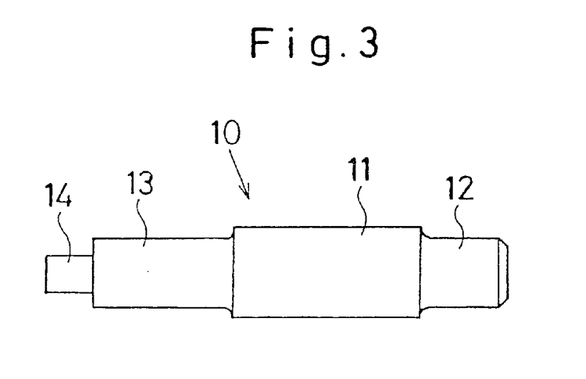
FIG. 3 is a side elevational view of the shaft member of the frictional hinge device.

As depicted in FIGS. 2, 3, the metallic shaft 10 is made of steel or stainless steel (SUS) to form a bar-shaped configuration. The metallic shaft 10 has a diameter-increased section 11 (e.g., 5 mm in diameter) at a middle portion and diameter-reduced sections 12, 13 (e.g., 4 mm in diameter) at right and left end portions. The left ended diameter-reduced section 13 has a dowel 14 to connectedly interfit into the lid plate 30.

Figure 4:
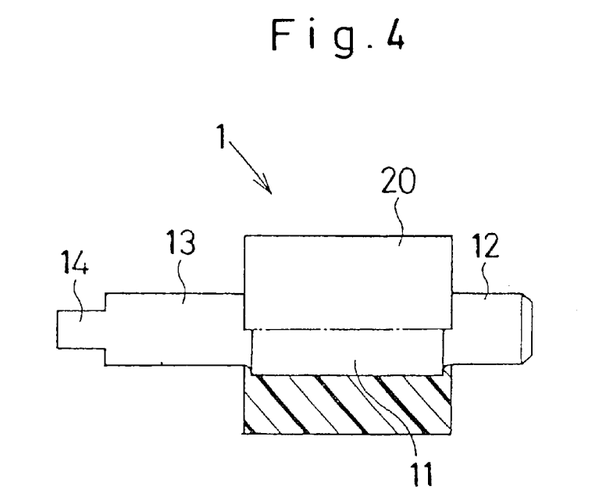
FIG. 4 is a side elevational view of the frictional hinge device.
Figure 5:
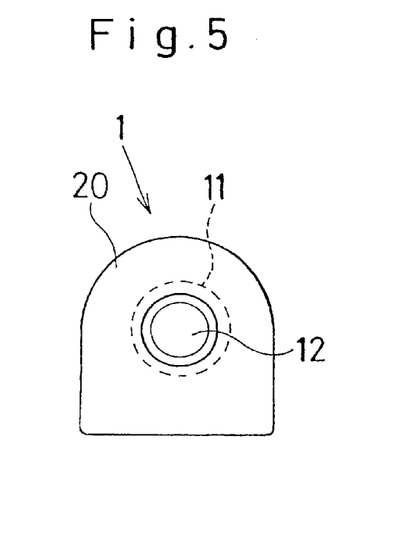
FIG. 5 is a plan view of the frictional hinge device.
Figure 6:
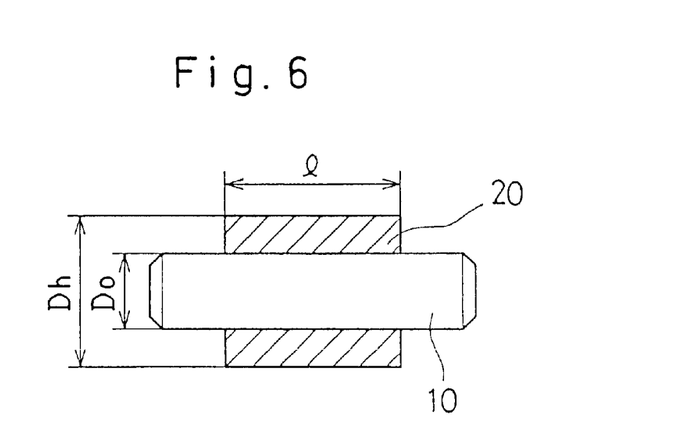
FIG. 6 is a schematic view of the frictional hinge device.
Figure 6A:
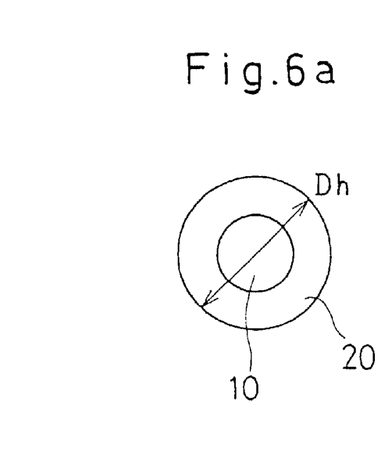
FIGS. 6a~6d are views to illustrate examples of diametrical equivalents.
Figure 6B:
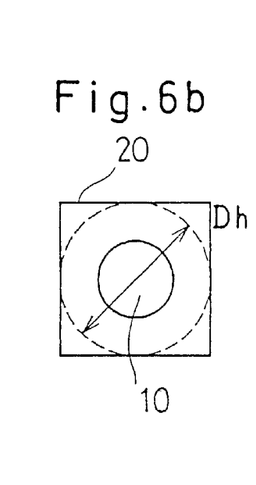
Figure 6C:
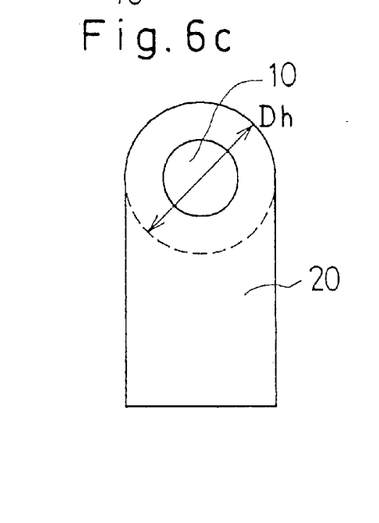
Figure 6D:
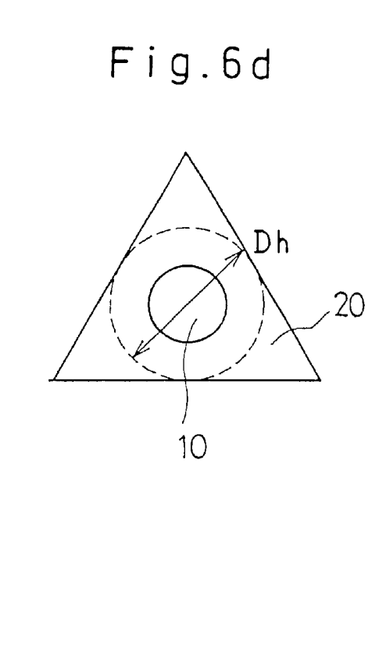

As shown in FIGS. 4, 5, the support block 20 is formed by a synthetic resin (e.g., PAR (polyarylate) which tightly engages with an outer surface of the diameter-increased section 11 of the metallic shaft 10. In this instance, powdered synthetic resin is injected into a mold (heated to about 140° C.) in which the metallic shaft 10 was placed in advance.

At the time of molding the synthetic resin around the metallic shaft member 10, the mold is preheated to around 140° C. This establishes a surface friction resistance between the support block 20 and the metallic shaft 10 due to a residual stress appeared between the support member and the metallic shaft member when cooling the synthetic resin to shrink.

It is to be noted that the molding the synthetic resin around the metallic shaft 10 is a rather additional matter in view of a shape factor (W) described hereinafter.

Then, the frictional hinge device 1 holds the lid plate 30 at any angular position in relation to a main frame of the personal computer 32. For this reason, it is necessary to adjust the frictional torque between the metallic shaft 10 and the support block 20 when the torque is less than a predetermined value. While it is necessary to provide a smooth pivotal movement with the metallic shaft 10 when the frictional torque is greater than the predetermined value.

In order to satisfy the above requirements, the shape factor (W) in relation to the metallic shaft 10 and the support block 20 is defined as follows:

$$1.5 \leq W \leq 3.5$$

Where $$W=\{1+(Do/Dh)^2\}/\{1-(Do/Dh)^2\},$$

(Do) is a diameter of the metallic shaft 10, (Dh) is a diameter or its equivalent of the support block 20.

FIG. 6 and FIGS. 6a~6d show diametrical equivalents of the support block 20 at (Dh) in addition to the diameter (Do) of the metallic shaft 10.

Figure 7:
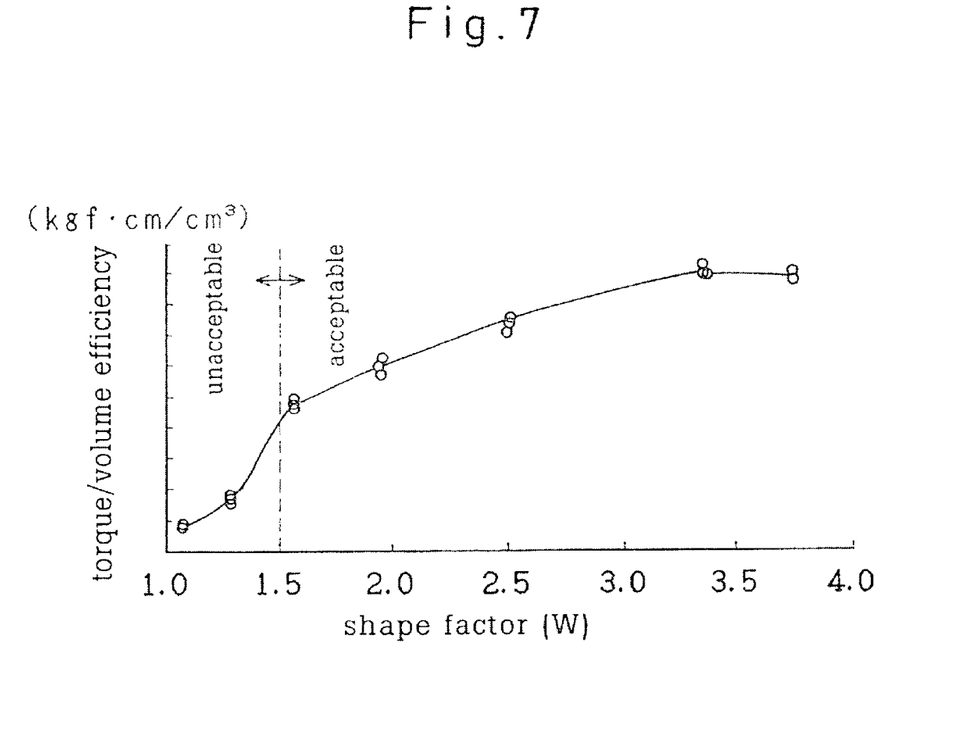
FIG. 7 is a characteristic curve showing a relationship between a shape factor (W) and a torque/volume efficiency.

The shape factor (W) is 1.5 or greater because a torque/volume efficiency rapidly drops as shown in FIG. 7 when the shape factor (W) becomes less than 1.5. The torque/volume efficiency is obtained by dividing the frictional torque by a volume of the support block 20 as indicated by a formula below.

$$\text{The torque/volume efficiency} = T/AL = T/\{\pi L \times [(Dh/2)^2 - (Do/2)^2]\}$$

Where

T is the frictional torque,

L is the mold length of the support block 20,

A is a cross sectional area of the support block 20,

Do is the diameter of the metallic shaft 10,

Dh is the diameter or its equivalent of the support block 20.

As observed from the formula, the frictional torque per volume of the support block 20 favorably increases with the increase of the torque/volume efficiency. When the torque/volume efficiency unacceptably decreases, it becomes difficult to fully effectuate the properties which the synthetic resin exhibits.

Figure 8:
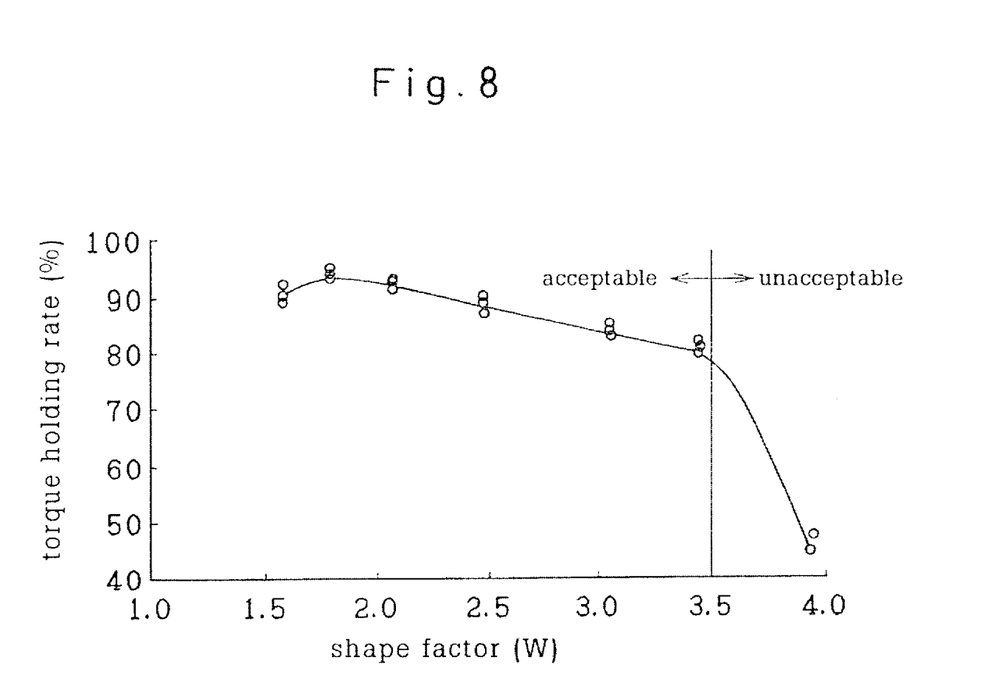
FIG. 8 is a characteristic curve showing a relationship between a shape factor (W) and a torque holding rate.

The shape factor (W) is determined to be 3.5 or less because a torque holding rate abruptly drops before and after undergoing an endurance experimental test when the shape factor (W) exceeds 3.5 as shown in FIG. 8. The torque holding rate (Tr) is expressed by a formula below.

$$Tr(\%)=\{(\text{torque measured after undergoing a deteriorating experimental test or endurance experimental test})/(\text{initial torque})\} \times 100$$

Figure 9:
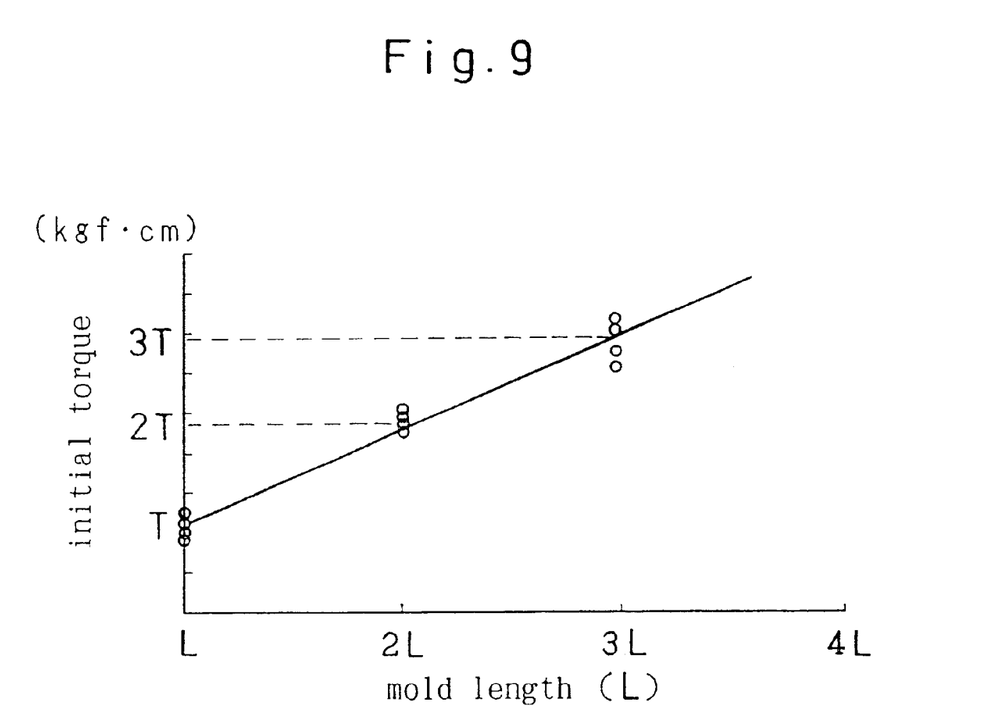
FIG. 9 shows a linear relationship between an initial torque (T) and a mold length (L)

As shown in FIG. 9, a linear relationship is observed between a mold length (L) of the support block 20 and an initial torque (T) which is equivalent to the surface friction resistance between the metallic shaft 10 and the support block 20. The initial torque (T) is expressed by $$T=(\pi/2) \cdot (Do)^2 \cdot L \cdot (S/W) \cdot \mu.$$

Where

Do is the diameter of the metallic shaft 10,

L is the mold length of the support block 20,

S is a residual stress within the support block 20,

W is the shape factor, $\mu$ is a frictional coefficient between the metallic shaft 10 and the support block 20.

Suppose that the parameters Do, S, W and $\mu$ are constant (C), T is represented by C×L. Namely, the initial torque (T) is in a linear relationship with the mold length (L) in which the surface friction resistance is equivalent to a total frictional length between the support block 20 and the metallic shaft 10.

With the linear relationship between the initial torque (T) and the mold length (L) in mind, it is possible to cope with a greater torque required between the support block 20 and the metallic shaft 10 by combining the same frictional hinge devices appropriately.

Figure 10:
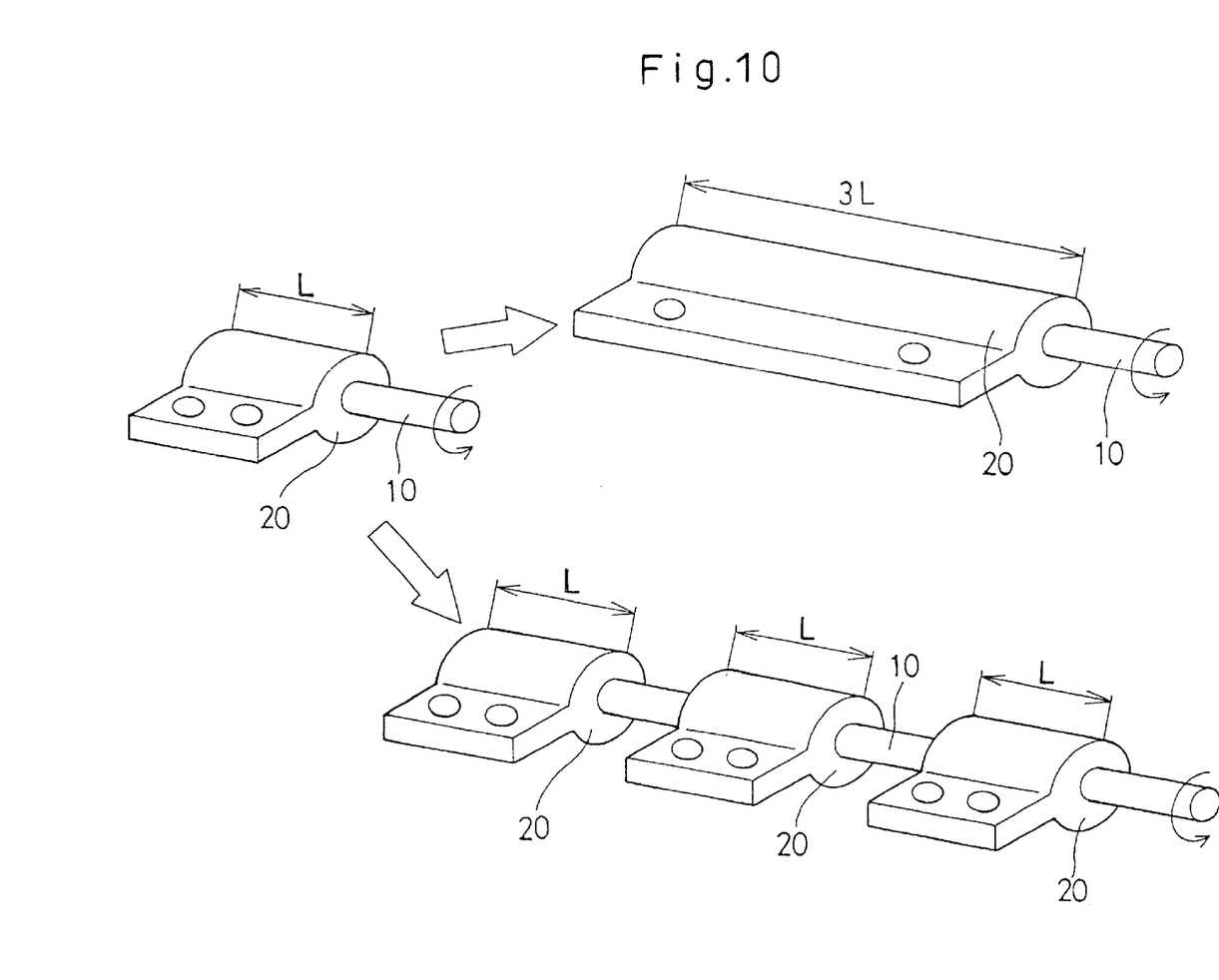
FIG. 10 is perspective views of frictional hinge devices showing how to cope with a device which requires a greater torque.

As illustrated in FIG. 10, a three-fold mold length (3L) is usually required to cope with a three-fold torque required between the support block 20 and the metallic shaft 10. However, this is accomplished by arranging three same frictional hinge devices in series with each other.

In this way, it is possible to deal with an increased torque between the metallic shaft 10 and the support block 20 by combining the same frictional hinge devices. This eliminates the necessity of discretely manufacturing a longer frictional hinge device. This is advantageous in cost particularly when reduced to mass production.

In order to provide a stable surface friction resistance with the metallic shaft 10, the synthetic resin used to the support block 20 needs a smaller fluctuation of a bending elasticity (GPa) under an operating temperature ranging from e.g., −20 to 80° C.

Figure 11:
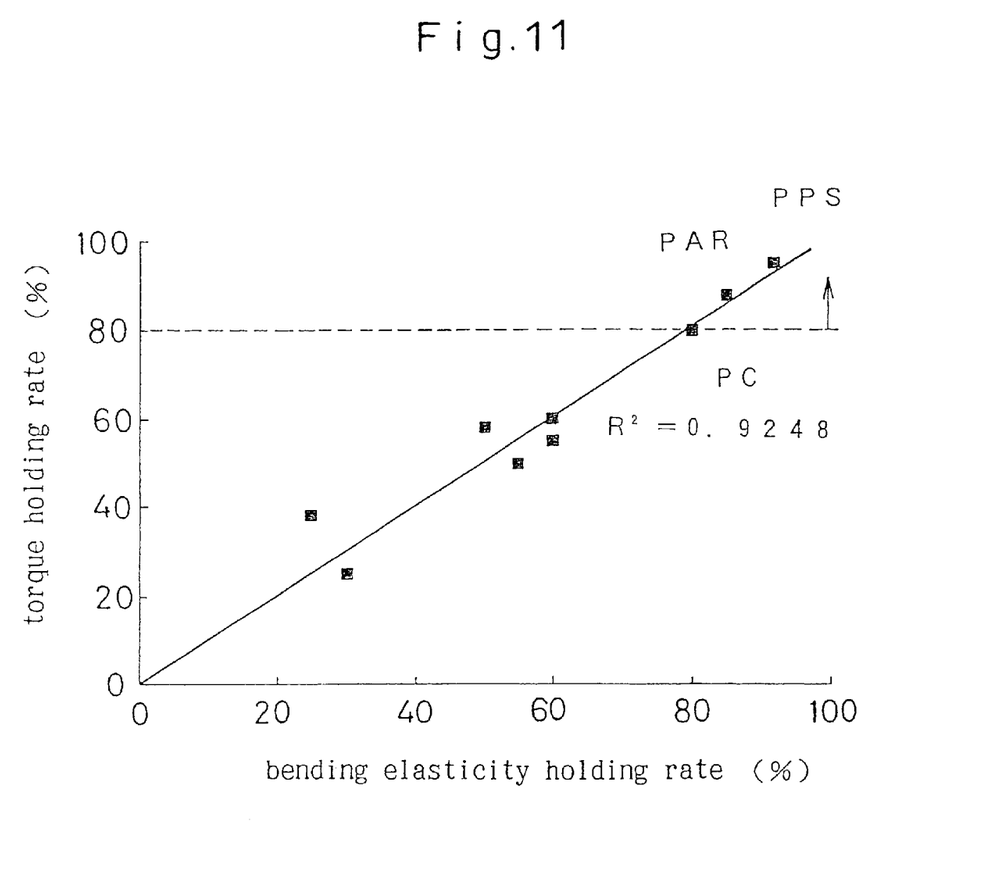
FIG. 11 is characteristics showing a relationship between a bending elasticity holding rate and the torque holding rate on a variety of synthetic resins.

This is based on a graphical representation in FIG. 11 which represents a relationship between a torque holding rate and bending elasticity holding rate in which the torque holding rate of 80% or more corresponds to the bending elasticity holding rate of 80% or more. By using the synthetic resin having a higher bending elasticity holding rate (i.e., smaller fluctuation of the bending elasticity under the predetermined operating temperature range), it is possible to achieve a higher torque holding rate.

Figure 12:
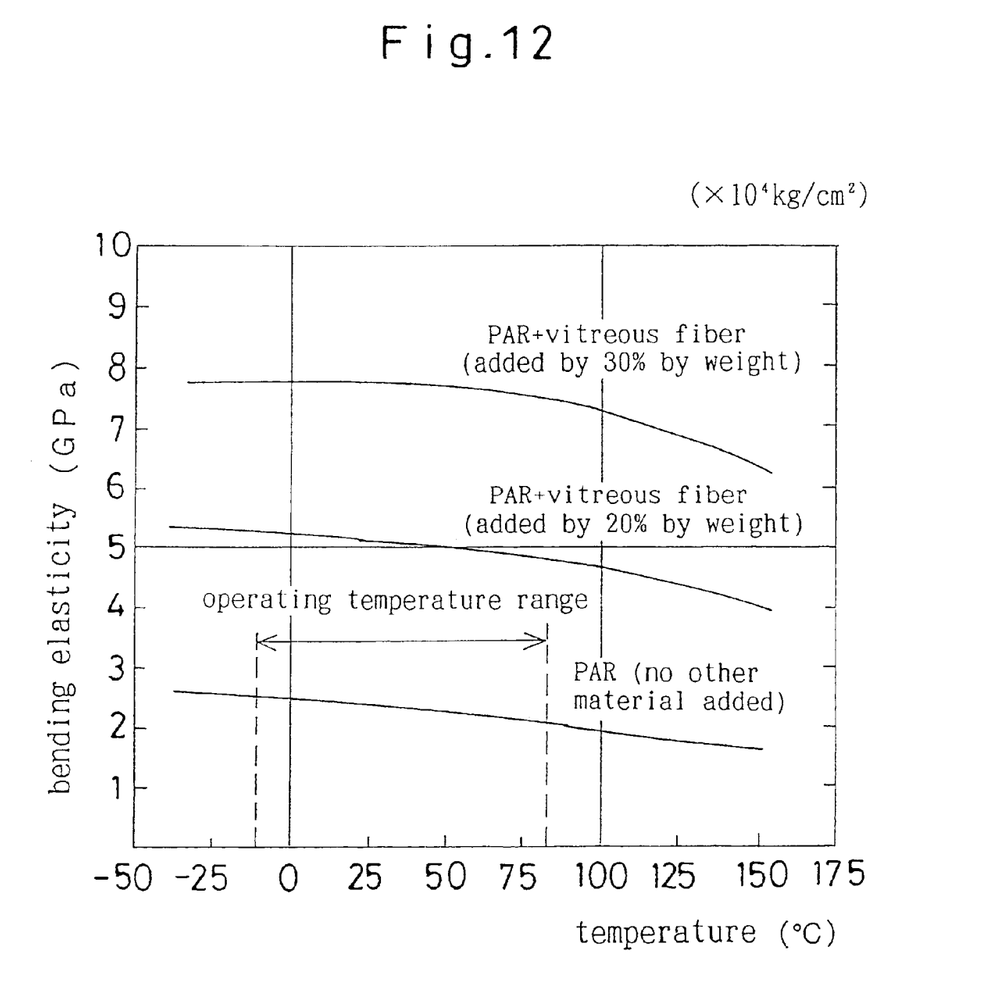
FIG. 12 is a characteristic curve showing a relationship between a bending elasticity and temperature on the synthetic resins in which a fluctuation of the bending elasticity is relatively small.
Figure 13:
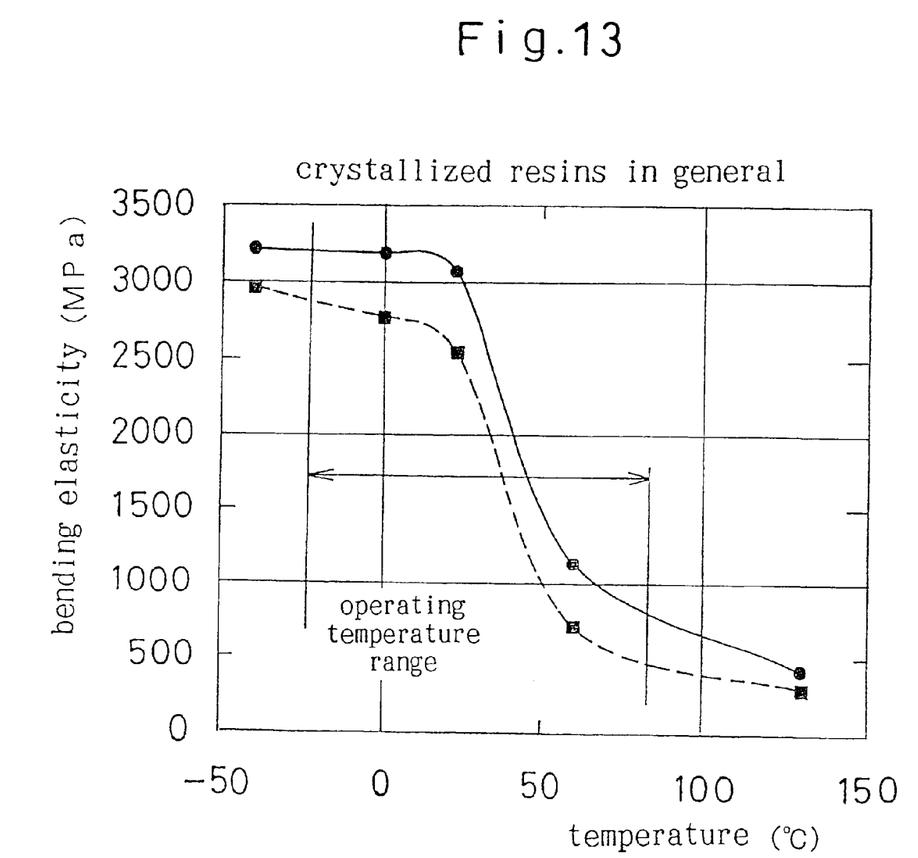
FIG. 13 is a characteristic curve showing a relationship between the bending elasticity and temperature on crystallized resins in general for the purpose of comparing with FIG. 12.

FIGS. 12, 13 show a relationship between the bending elasticity holding rate and the ambient temperature. As depicted in FIG. 12, PAR is suited to the synthetic resin for the support block 20 from the reason that the bending elasticity does not change significantly under the ambient temperature in which the personal computer 32 is placed. In the crystallized resins used in general, the bending elasticity changes greatly under the operating temperature as shown in FIG. 13. When these crystallized resins are applied to the support block 20, make sure to use under such an operating temperature range as to provide an appropriate surface friction resistance between the metallic shaft 10 and the support block 20.

With this in mind, the synthetic resins are selected from below which loses less physical properties when crystallized.

These synthetic resins are PAR (polyarylate), PC (polycarbonate), PPS (polyphenylene sulphide), PES (polyether sulfone), PEEK (polyether ether ketone) and the like.

As a modification form, an outer surface of the metallic shaft 10 can be polished by buffing in order to have a surface roughness (Ra) ranging from 0.15 to 0.35 $\mu$m.

As a second embodiment of the invention, added to the above synthetic resin is an organic or inorganic based antifriction medium (within 10% by weight) such as fluoro-based resin, olefine-based resin, carbon, carbon fiber, molybdate bisulfide, potassium titanate or the like.

Figure 14:
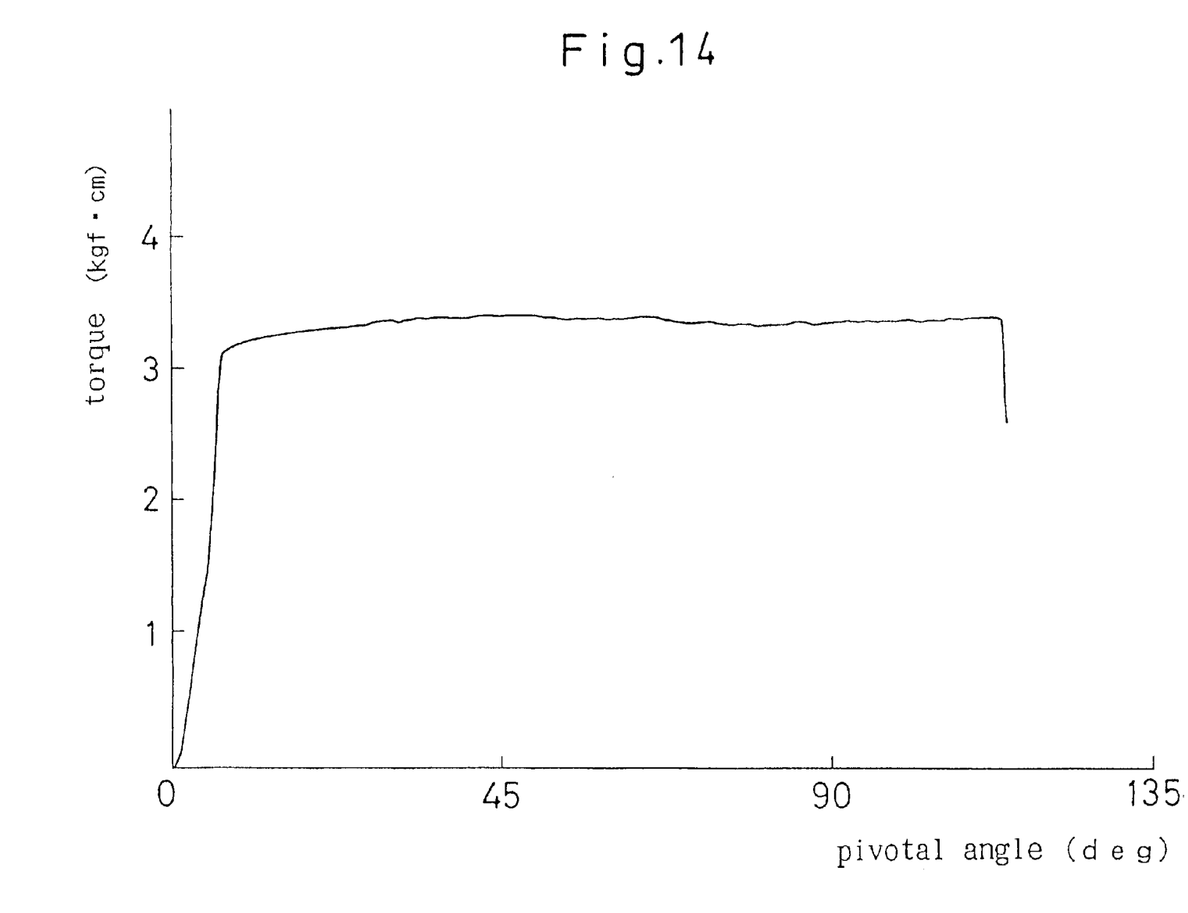
FIG. 14 is a characteristic curve showing a relationship between the pivotal angle and frictional torque according to a second embodiment of the invention when an antifriction medium is added to the synthetic resin of a support member.
Figure 15:
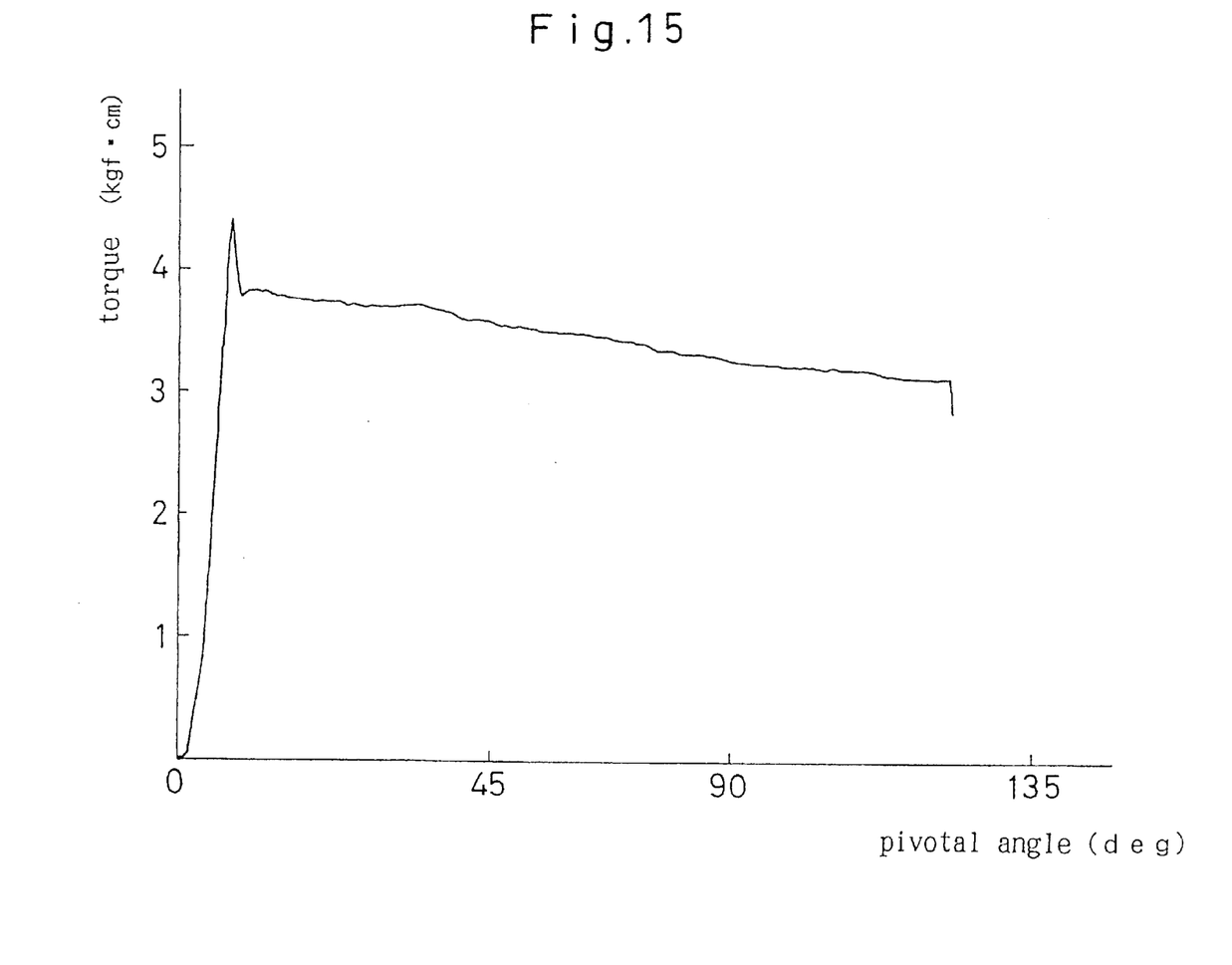
FIG. 15 is a characteristic curve showing a relationship between the pivotal angle and frictional torque in reference to FIG. 14 when an antifriction medium is not added to the synthetic resin of the support member.

By comparing FIG. 14 in which PTFE (polytetrafluoroethylene) is added by 3% by weight to the synthetic resin with FIG. 15 in which PTFE is not added, it is readily found that the metallic shaft 10 can pivot smoothly from the beginning when PTFE is added. This substantially reduces the wear dust due to the friction between the metallic shaft 10 and the support block 20.

Figure 16:
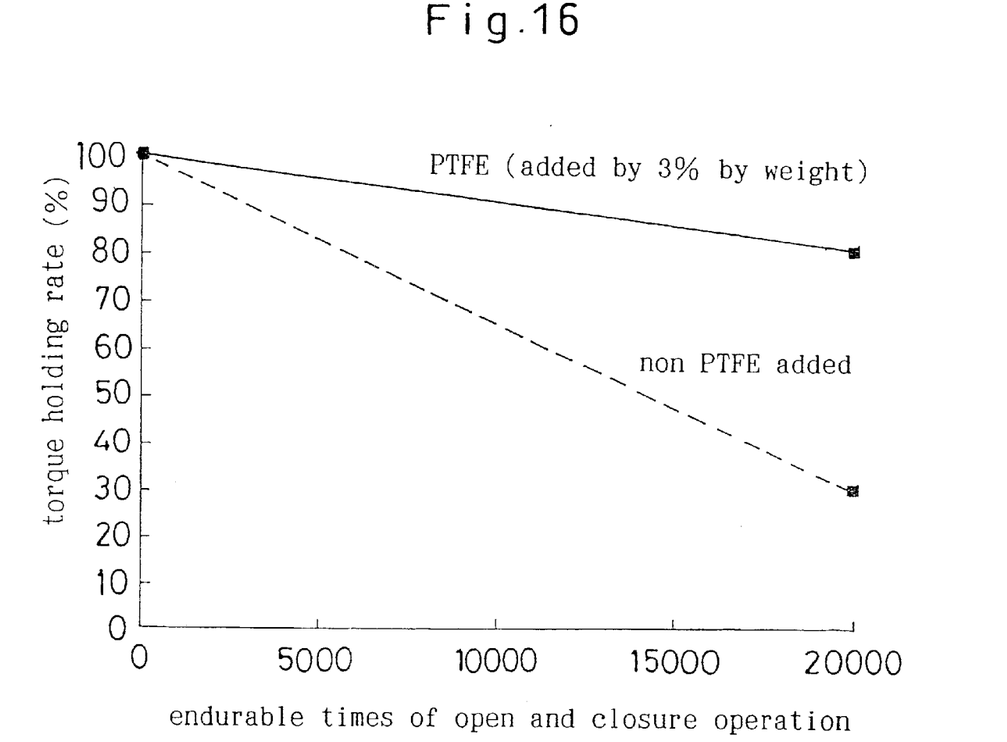
FIG. 16 shows a linear relationship between an endurance limit and the torque holding rate to compare the case in which the antifriction medium is added and the case in which the antifriction medium is not added to the synthetic resin of the support member.

FIG. 16 compares the endurance in which the antifriction medium is added with the endurance in which the antifriction medium is not added. When the antifriction medium is added, reduction of the torque holding rate is almost inappreciable, thereby leading to a long period of service life.

As a third embodiment of the invention, added to the synthetic resin is mineral, vitreous fiber, carbon fiber or the like within 40% by weight so as to impart a sufficient mechanical strength with the support block 20 when forming the support block 20 in integral with the metallic shaft 10.

As understood from the foregoing description, the shape factor (W) in relation to the metallic shaft 10 and the support block 20 is defined as $1.5 \leq W \leq 3.5$. This increases the torque/volume efficiency and the torque holding rate to tightly engage the support block 20 against the metallic shaft 10. This eliminates variations on the frictional torque, the stickslip phenomenon, the abnormal noise and an initial sticking upon pivoting the support block 20 against the metallic shaft 10 so as to maintain a stable surface friction resistance with a good endurance.

This enables to hold the lid plate 30 at the desired angular position with a comfortable operation when the lid plate 30 is pivoted upward and downward.

Further, by molding the support block 20 with the synthetic resin around the metallic shaft 10, it is possible to reduce a manufacturing cost as a whole.

With the smaller fluctuation of the bending elasticity used to the synthetic resin, it is possible to maintain the stable surface friction resistance against the metallic shaft 10 under various operating environments, thereby making it easy to use the lid plate 30 of the business device.

It is to be noted that an outer surface of the metallic shaft 10 and inner surface of the support block 20 may be polished by buffing to provide a smooth surface with a smaller surface roughness (Ra).

It is to be observed that instead of the lid plate of the note type personal computer, the frictional hinge device may be applied to various lid plates for a copy machine, porcelain toilet, automobile hatch, hood, carrier bed plates of trucks, windows of living houses and keyboards of pianos.

The frictional hinge device can be applied to any article in which a lid plate is held at the desired angular position by the surface friction resistance between the metallic shaft member and the support member.

While there has been described what is at present thought to be preferred embodiments of the invention, it will be understood that modifications may be made therein and it is intended to cover in the appended claims all such modifications which fall within the scope of the invention.

What is claimed is:

1. A frictional hinge device comprising:

a metallic shaft member having a rotational axis as a rotational center;

a support member which rotatably supports said metallic shaft member;

said support member being relatively rotatable in relation with said metallic shaft member and held at any angular position by a surface friction resistance between said support member and said metallic shaft member; and said support member being molded in a synthetic resin around said metallic shaft member when a powdered synthetic resin is injected into a mold, so as to establish said surface friction resistance between said support member and said metallic shaft member due to a residual stress appeared therebetween and cooling said synthetic resin to shrink; and a shape factor (W) in reliance to said metallic shaft member and said support member being defined as follows:

$$1.5 \leq W \leq 3.5$$

where $$W = \{1+(D_o/D_h)^2\}/\{1-(D_o/D_h)^2\},$$

($D_o$) is a diameter of said metallic shaft member, ($D_h$) is a diameter or its equivalent of said support member.

2. The frictional hinge device as set forth in claim 1, wherein said surface friction resistance is equivalent to a total frictional length between said support member and said metallic shaft member.

3. A portable business device in which said frictional hinge device as set forth in the claim 2 is used to pivotably support a display thereof.

4. A portable business device in which said frictional hinge device as set forth in the claim 1 is used to pivotably support a display thereof.

* * * * *